(12) United States Patent
Kawata

(10) Patent No.: US 11,995,507 B2
(45) Date of Patent: May 28, 2024

(54) READING DEVICE AND HANDY SCANNER HOLDER

(71) Applicant: TOSHIBA TEC KABUSHIKI KAISHA, Tokyo (JP)

(72) Inventor: Kento Kawata, Chigasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/324,182

(22) Filed: May 26, 2023

(65) Prior Publication Data

US 2024/0037356 A1 Feb. 1, 2024

(30) Foreign Application Priority Data

Jul. 26, 2022 (JP) .................. 2022-118822

(51) Int. Cl.
*G06K 7/10* (2006.01)
*G06Q 20/20* (2012.01)

(52) U.S. Cl.
CPC ......... *G06K 7/109* (2013.01); *G06K 7/10386* (2013.01); *G06Q 20/208* (2013.01); *G06K 2007/10524* (2013.01)

(58) Field of Classification Search
CPC ............... G06K 7/10881; G06K 7/109; G06K 2007/10524
See application file for complete search history.

(56) References Cited

U.S. PATENT DOCUMENTS

| | | | | |
|---|---|---|---|---|
| 5,105,070 | A | * | 4/1992 | Wike, Jr. ............... G06K 7/109 359/223.1 |
| 5,691,528 | A | | 11/1997 | Wyatt et al. |
| 6,527,185 | B2 | | 3/2003 | Katoh et al. |
| 7,273,180 | B2 | * | 9/2007 | Zhu ..................... G06K 7/10881 235/472.01 |
| 8,590,795 | B2 | * | 11/2013 | Vincenzi ............... G06K 7/109 235/472.02 |
| 9,298,961 | B2 | * | 3/2016 | Mazzone ........... G06K 7/10752 |
| 10,762,314 | B2 | * | 9/2020 | Suman ............... G06K 7/10732 |
| 2012/0145793 | A1 | * | 6/2012 | Kearney ................ G06K 7/109 235/472.01 |
| 2020/0184164 | A1 | * | 6/2020 | Utykanski .......... G06K 7/10821 |
| 2022/0058351 | A1 | * | 2/2022 | Naito ................. G06K 7/10198 |

\* cited by examiner

*Primary Examiner* — Steven S Paik
*Assistant Examiner* — April A Taylor
(74) *Attorney, Agent, or Firm* — Amin, Turocy & Watson, LLP

(57) ABSTRACT

A reading device includes: a handy scanner; an adjuster; and a pedestal. The handy scanner includes a head incorporating a reading sensor and a handle which is a gripping part having one end portion connected to the head, and configured to read a code symbol image by the reading sensor. The adjuster is attached to the head and surrounds a readable angular area of the reading sensor. The pedestal is a portion to which the adjuster is detachably coupled, and holds the adjuster in such a direction that the readable angular area of the reading sensor is substantially equal in an up-down direction with respect to a horizontal direction.

20 Claims, 19 Drawing Sheets

FIG. 5
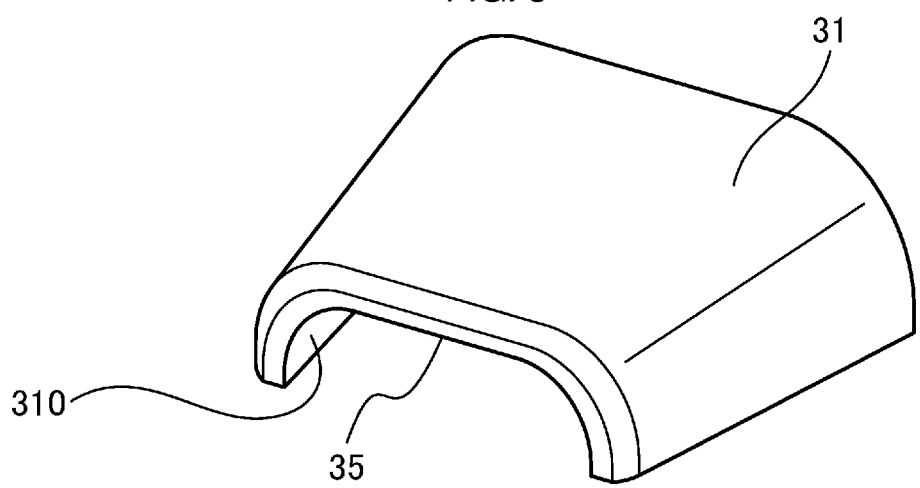
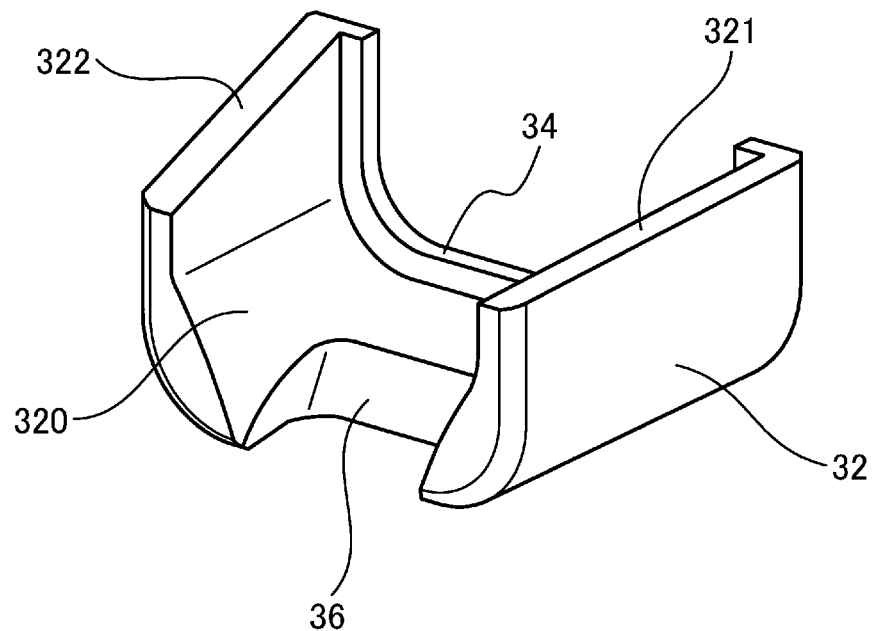

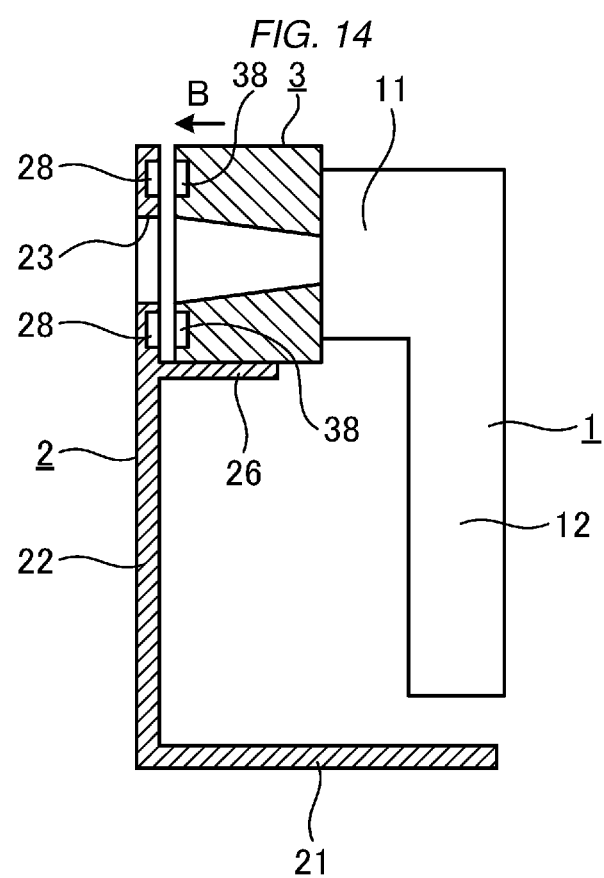

READING DEVICE AND HANDY SCANNER HOLDER

CROSS-REFERENCE TO RELATED APPLICATION

This application is based upon and claims the benefit of priority from Japanese Patent Application No. 2022-118822, filed on Jul. 26, 2022, the entire contents of which are incorporated herein by reference.

FIELD

Embodiments described herein relate generally to a reading device and a handy scanner holder.

BACKGROUND

In recent years, a point of sales (POS) terminal device installed on a checkout counter in a convenience store or the like may also be usable as a self-checkout device (hereinafter, such a terminal device is referred to as a dual-purpose terminal). The dual-purpose terminal is used by switching between an operation mode as a normal register to be operated by a store clerk and an operation mode as a self-checkout device to be operated by a customer, in accordance with a crowded situation or the like in the store.

Here, a reading device (code scanner) that decodes a code symbol image such as a bar code or a two-dimensional code is generally attached to the POS terminal device. There is room for improvement in usability of the reading device in the dual-purpose terminal as described above.

For example, since the store clerk is accustomed to a handy scanner that is used by being held in hand, the store clerk tends to feel that a handy type reading device is easy to use. On the other hand, a customer who operates the self-checkout device is accustomed to a fixed type reading device that is integrally built in a device housing, the customer tends to feel that a fixed or stationary type reading device is easy to use. Therefore, if the reading device attached to the POS terminal device is only a handy type or a stationary type, operability deteriorates for either the store clerk or the customer.

Techniques have been proposed in the past for making a handy type reading device (handy scanner) usable as a stationary type. However, considering, for example, a reading angle or stability of the device, it is hard to say that the reading device disclosed in the related art provides operability close to that of a fixed type (or a stationary type) reading device included in a current self-checkout device.

DESCRIPTION OF THE DRAWINGS

FIG. 5 is an exploded perspective view of the adjuster 3 viewed from the rear side;

FIG. 14 is a diagram schematically showing an example of a coupling structure between the pedestal 2 and the adjuster 3 according to a second embodiment;

FIG. 15A is a plan view and FIG. 15B is a side view;

DETAILED DESCRIPTION

In general, according to one embodiment, a reading device that can be used in both a use mode capable of providing operability close to that of a built-in reading device and a use mode as a handy type is provided.

According to another embodiment, a holder that enables a handy scanner to be used in both a use mode capable of providing operability close to that of a built-in reading device and a use mode as a handy type is provided.

A reading device according to the embodiment includes: a handy scanner; an adjuster; and a pedestal. The handy scanner includes a head incorporating a reading sensor and a handle which is a gripping part having one end portion connected to the head, and configured to read a code symbol image by the reading sensor. The adjuster is attached to the head and surrounds a readable angular area of the reading sensor. The pedestal is a portion to which the adjuster is detachably coupled, and holds the adjuster in such a direction that the readable angular area of the reading sensor is substantially equal in an up-down direction with respect to a horizontal direction.

First Embodiment

Figure 1:
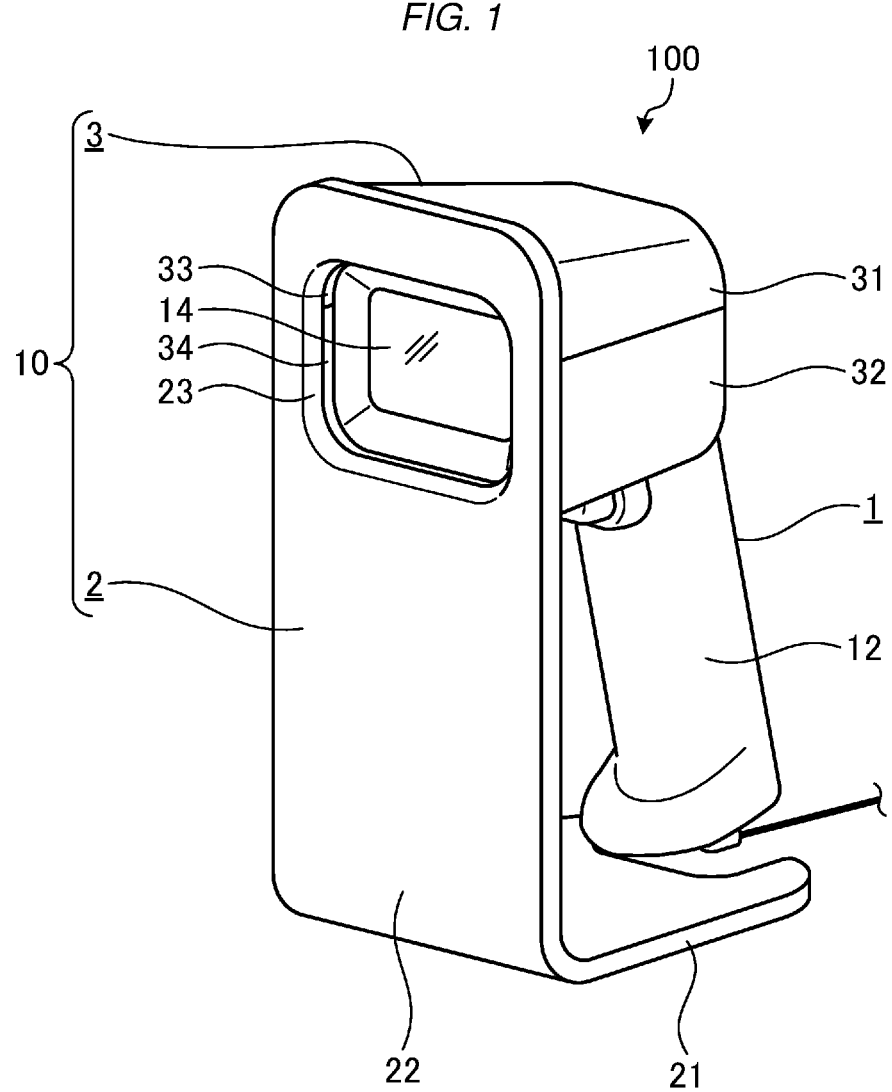
FIG. 1 is a perspective view showing an appearance of a reading device 100 according to a first embodiment viewed from a front side.
Figure 2:
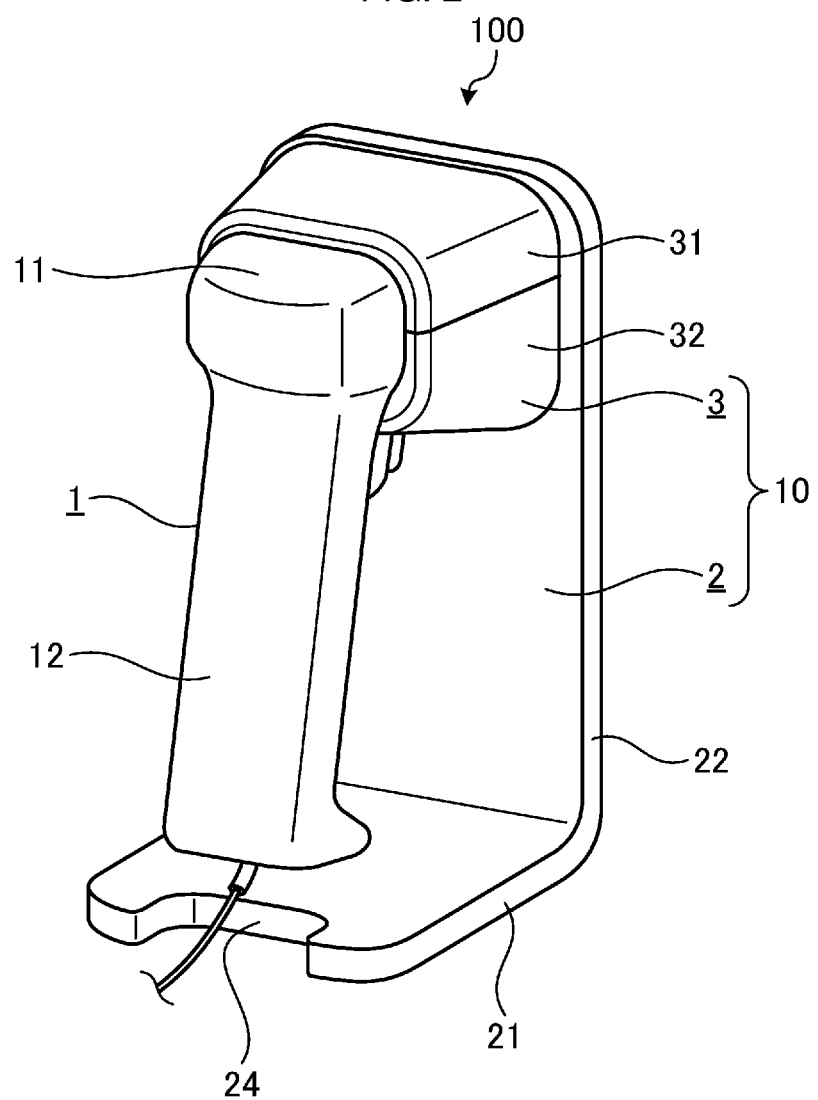
FIG. 2 is a perspective view showing the appearance of the reading device 100 viewed from a rear side.
Figure 3:
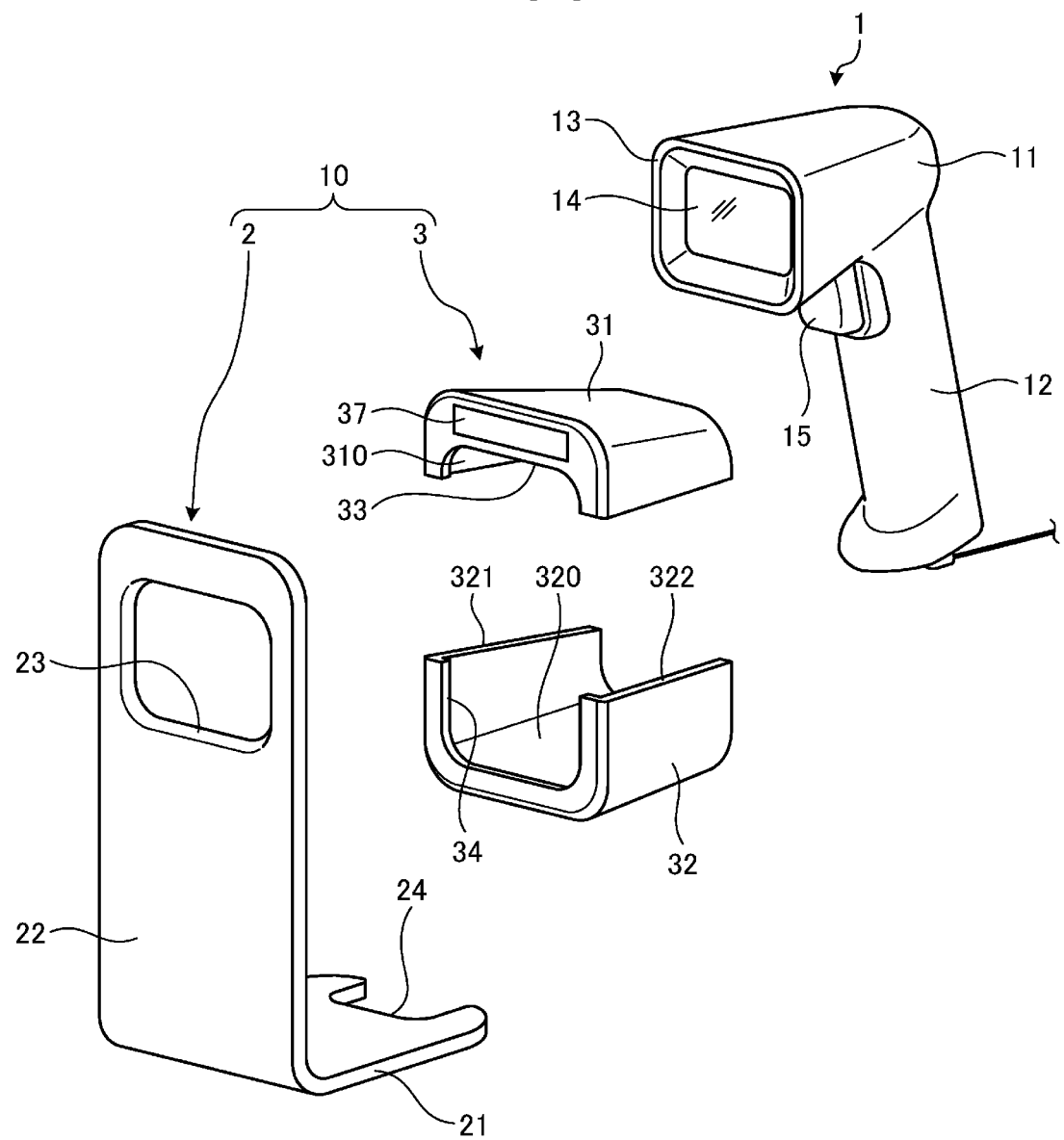
FIG. 3 is an exploded perspective view showing a configuration of the reading device 100.

A first embodiment will be described with reference to the drawings. FIG. 1 is a perspective view showing an appearance of a reading device 100 according to the first embodiment viewed from a front side. FIG. 2 is a perspective view showing the appearance of the reading device 100 viewed from a rear side. FIG. 3 is an exploded perspective view showing a configuration of the reading device 100. Here, a side where a reading target is held with respect to the reading device 100 is defined as the front side. The reading device 100 shown in FIGS. 1 and 2 is in a state of being used as a stationary type.

The reading device 100 includes a handy scanner 1, a pedestal 2, and an adjuster 3. The pedestal 2 and the adjuster 3 constitute a holder 10 for holding the handy scanner 1 in a use state as the stationary type.

The handy scanner 1 itself is used in a hand-held manner, and is roughly divided into a head 11 and a handle 12.

The head 11 includes a housing 13 and an illumination and an imaging sensor incorporated in the housing 13. The housing 13 has a shape spreading from top to bottom like a quadrangular pyramid, and includes a reading window 14 at a position corresponding to the bottom of the pyramid. The reading window 14 transmits light emitted by the illumination incorporated in the housing 13 and takes in the light from the outside of the housing 13. The illumination is, for example, a light emitting diode (LED), and illuminates a code symbol image held toward the reading window 14. The imaging sensor is an example of a reading sensor, and reads the code symbol image by area reading. More specifically, the imaging sensor captures an image of the code symbol image illuminated by the illumination and outputs two-dimensional image data. The code symbol image is, for example, a bar code or a two-dimensional code.

The handle 12 is a portion (gripping part) that an operator grips if using the handy scanner 1 by holding in hand, and is connected to one end portion of the head 11 at a position corresponding to a side surface of the pyramid. The handle 12 is provided with a button 15 with which the handy scanner 1 receives a predetermined operation. A longitudinal direction of the handle 12 and a normal direction of a surface of the reading window 14 form an obtuse angle slightly larger than a right angle. The angle is set to a value that makes the handy scanner 1 easy to use if used as a handy type.

The pedestal 2 is a portion to which the adjuster 3 is detachably coupled, and holds the adjuster 3 in such a direction that a readable angular area of the imaging sensor is substantially equal in an up-down direction with respect to a horizontal direction. Such a pedestal 2 supports the adjuster 3 to hold the handy scanner 1 to which the adjuster 3 is attached in a state of being used as a stationary type. More specifically, the pedestal 2 holds the handy scanner 1 in a state in which the reading window 14 is positioned and fixed in a substantially forward direction, instead of upward or downward.

The pedestal 2 is a member having a shape in which a flat plate portion 21 having a surface facing downward in the illustrated state and a flat plate portion 22 having a surface facing forward in the illustrated state are continuous with each other on one side, and has a substantially L-shaped appearance in a side view. The surface of the flat plate portion 21 and the surface of the flat plate portion 22 are substantially orthogonal to each other.

In a stationary type use mode of the reading device 100, the flat plate portion 21 is in contact with an installation surface (a top surface of a checkout counter or the like). In the stationary type use mode of the reading device 100, the flat plate portion 22 is substantially upright with respect to the installation surface.

The flat plate portion 22 is provided with an opening 23 having a shape corresponding to the reading window 14. The opening 23 corresponds to a reading area of the handy scanner 1, that is, edges of the opening do not interfere with the reading area of the imaging sensor.

The flat plate portion 21 is provided with a cutout portion 24. Here, if the handy scanner 1 is used as the handy type, the pedestal 2 is used in a horizontally placed manner as a fixed position of the handy scanner 1. The horizontally placed manner of the pedestal 2 is a state in which the flat plate portion 22 is laid down. If the pedestal 2 is horizontally placed, the flat plate portion 21 is substantially upright with respect to the installation surface, so that the cutout portion 24 faces upward. The cutout portion 24 is a recess on which the handle 12 is placed so as not to turn around, and has a shape corresponding to a shape and a thickness of the handle 12.

A dimension of the flat plate portion 21 in a depth direction, that is, a length from the side connected to the flat plate portion 22 to a side on which the cutout portion 24 is provided, is a dimension suitable for supporting the handle 12 in a state in which the head 11 is placed on the flat plate portion 22 if the pedestal 2 is used in the horizontally placed manner as described above.

The adjuster 3 is a member that mediates attachment and detachment of the handy scanner 1 to and from the pedestal 2. The adjuster 3 has a tubular shape, is attached to the head 11, and surrounds the readable angular area of the imaging sensor. An opening of the tubular adjuster 3 faces a direction in which the imaging sensor takes in reflected light of an imaging target (a reading direction).

More specifically, the adjuster 3 includes an upper cover 31 that covers an upper side of the head 11 and a lower cover 32 that covers a lower side of the head 11. The head 11 is sandwiched between the upper cover 31 and the lower cover 32 in the up-down direction. The upper cover 31 and the lower cover 32 are integrally fixed to each other by engagement or the like of claws (not shown) provided on mating surfaces thereof (surfaces of the lower cover 32 indicated by reference numerals 321 and 322 and surfaces of the upper cover 31 facing the surfaces 321 and 322 in FIG. 3).

A recess 33 is formed on a front side of the upper cover 31. A recess 34 is formed on a front side of the lower cover 32. The recess 33 and the recess 34 surround edges of the reading window 14 facing the front side.

Figure 4:
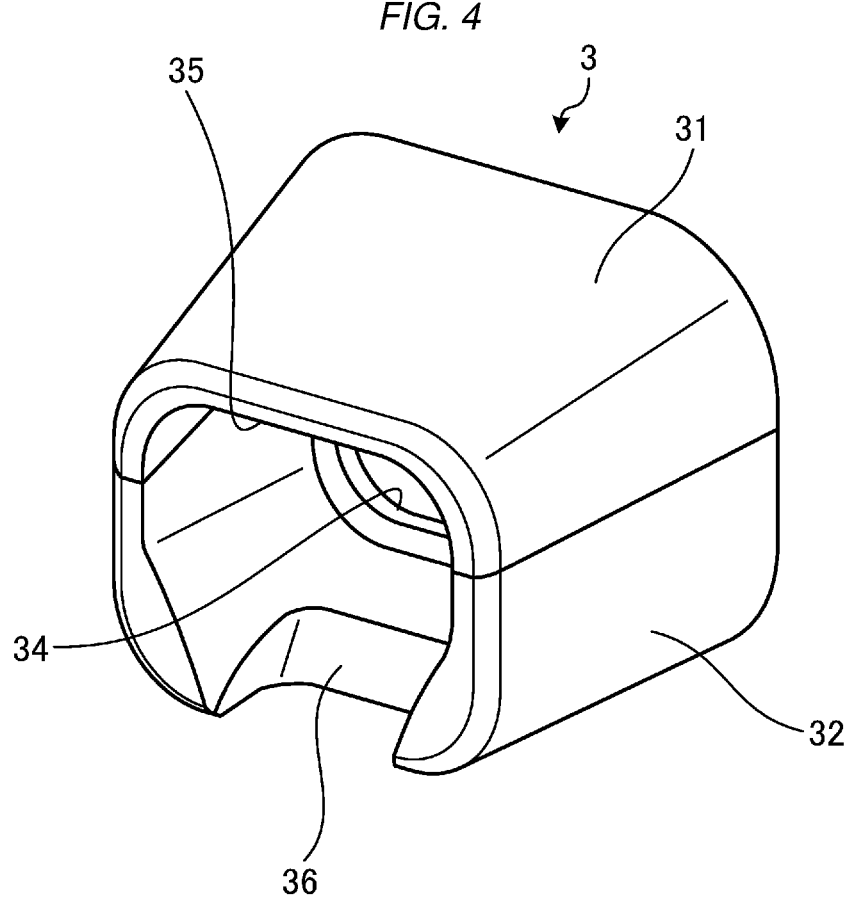
FIG. 4 is a perspective view showing an appearance of an adjuster 3 viewed from the rear side.
Figure 6:
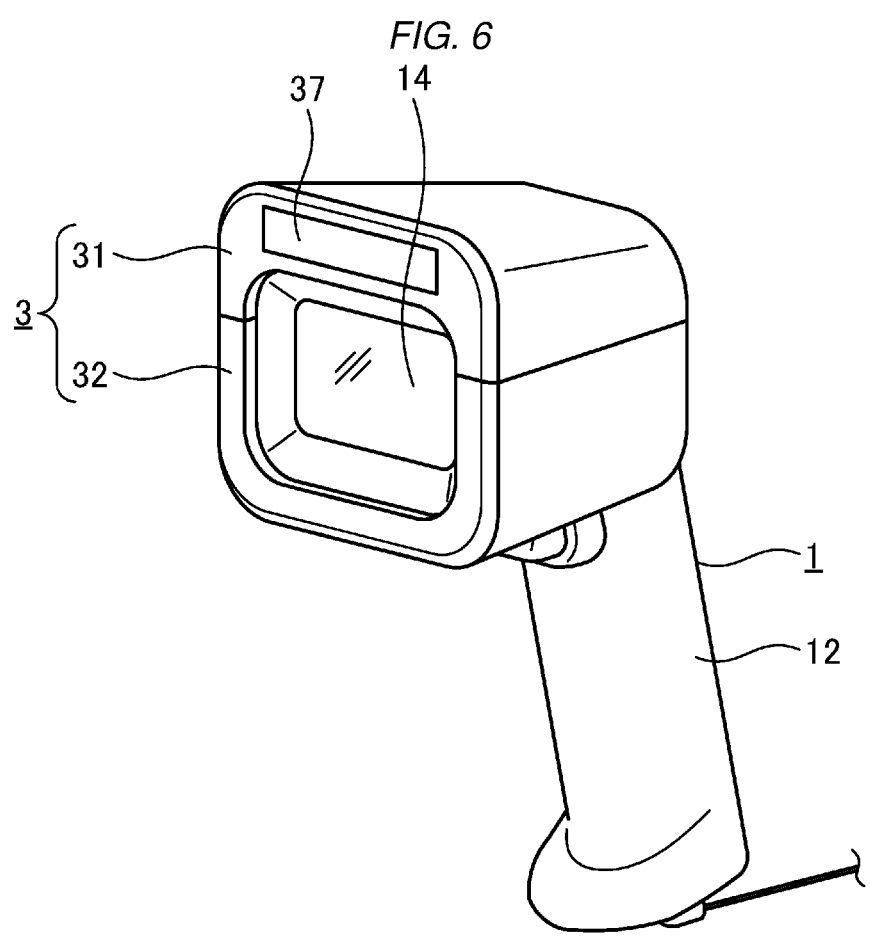
FIG. 6 is a perspective view showing an appearance of a handy scanner 1 to which the adjuster 3 is attached.

FIG. 4 is a perspective view showing an appearance of the adjuster 3 viewed from the rear side. FIG. 5 is an exploded perspective view of the adjuster 3 viewed from the rear side. FIG. 6 is a perspective view showing an appearance of the handy scanner 1 to which the adjuster 3 is attached.

A recess 35 is formed on a rear side of the upper cover 31. The recess 35 extends along an outer shape of the head 11 on an upper rear side. A recess 36 is formed on a rear side of the lower cover 32. The recess 36 extends along an outer shape of a base of the handle 12 on the front side.

An opening formed by the recess 35 and the recess 36 exposes the base of the handle 12 (a connection portion with the head 11). An opening formed by the recess 33 and the recess 34 on an opposite side exposes the reading window 14. Further, edges of the opening on this side are coupled to positions at the pedestal 2 surrounding the opening 23.

An engagement hole 37 is provided in an edge portion of the upper cover 31 on the front side (a side on the adjuster 3 farther from the imaging sensor). The engagement hole 37 is a horizontally long rectangular through hole formed in a plate, and is a portion with which an engagement claw 25 (to be described later, see FIG. 7) provided on the pedestal 2 is engaged. The adjuster 3 is held and fixed to the pedestal 2 by engagement between the engagement hole 37 and the engagement claw 25.

Figure 7:
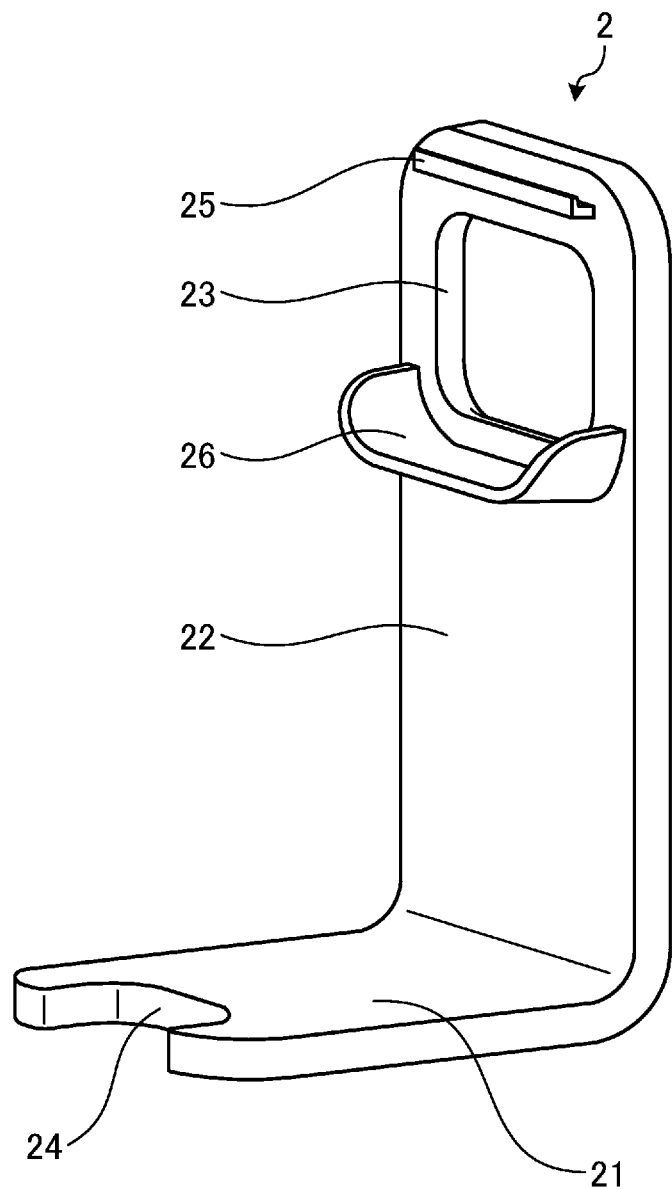
FIG. 7 is a perspective view showing an appearance of a pedestal 2 viewed from the rear side.
Figure 8:
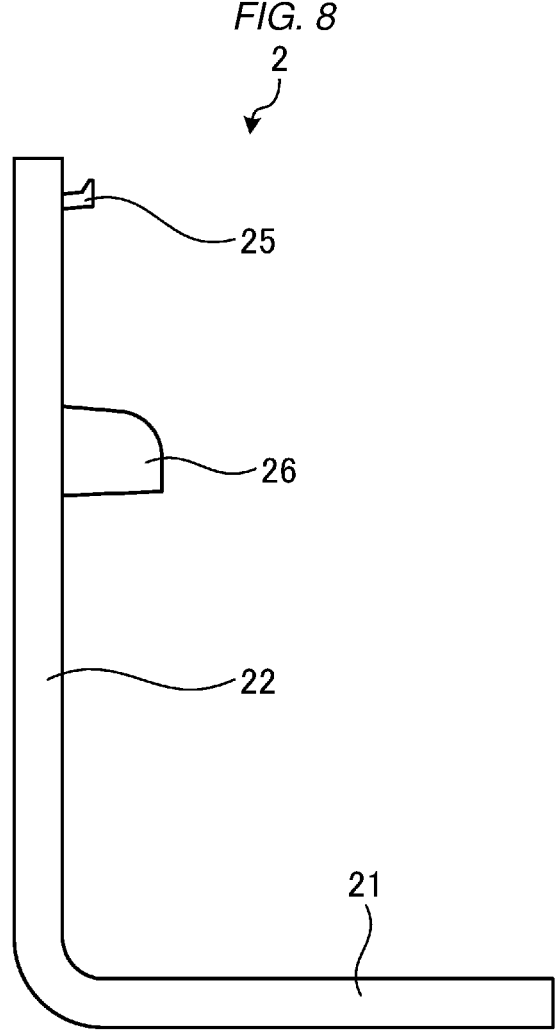
FIG. 8 is a side view showing the appearance of the pedestal 2.

FIG. 7 is a perspective view showing an appearance of the pedestal 2 viewed from the rear side. FIG. 8 is a side view showing the appearance of the pedestal 2. The pedestal 2 includes the engagement claw 25 and a support portion 26 on the rear side.

The engagement claw 25 engages with the engagement hole 37 provided on the front side of the adjuster 3. More specifically, the engagement claw 25 has a shape in which one long side of a horizontally long plate thereof is connected to a rear surface of the pedestal 2 and the other long side thereof is bent upward.

Figure 9:
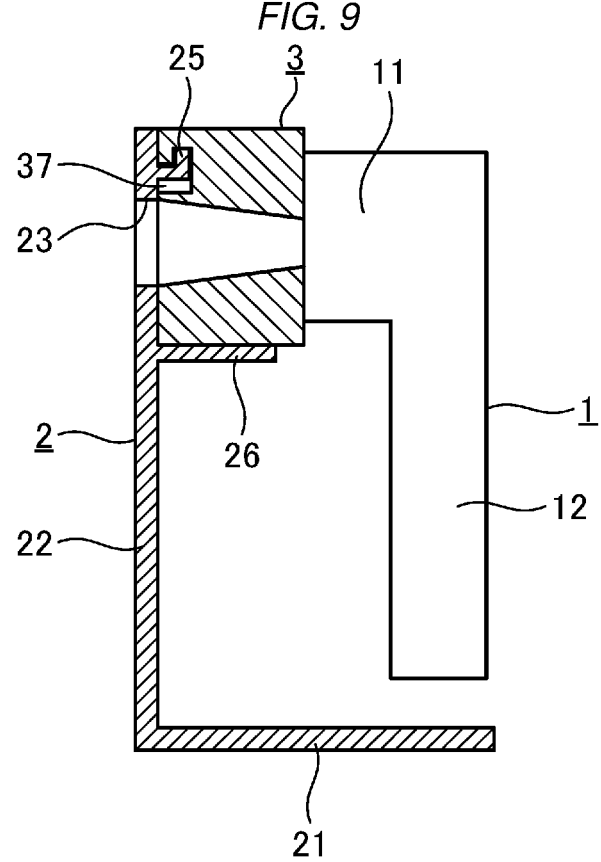
FIG. 9 is a diagram schematically showing an example of a coupling structure between the pedestal 2 and the adjuster 3.

The engagement hole 37 and the engagement claw 25 form a coupling structure for detachably coupling the adjuster 3 and the pedestal 2 to each other. FIG. 9 is a diagram schematically showing an example of the coupling structure between the pedestal 2 and the adjuster 3. A bent portion of the engagement claw 25 is inserted into the engagement hole 37 from a front side of a plate surface provided with the engagement hole 37, passes through the engagement hole 37, reaches a back side of the plate surface provided with the engagement hole 37, and interferes with an upper side of the plate surface provided with the engagement hole 37. Accordingly, the engagement claw 25 does not easily fall off from the engagement hole 37, and the adjuster 3 is suspended and held on the pedestal 2.

The support portion 26 is a portion that supports from below the head 11 hooked and held by the engagement claw 25, and the lower cover 32 that covers the head 11 is placed thereon. The support portion 26 shares the load of the handy scanner 1 and the adjuster 3 with the engagement claw 25.

Figure 10:
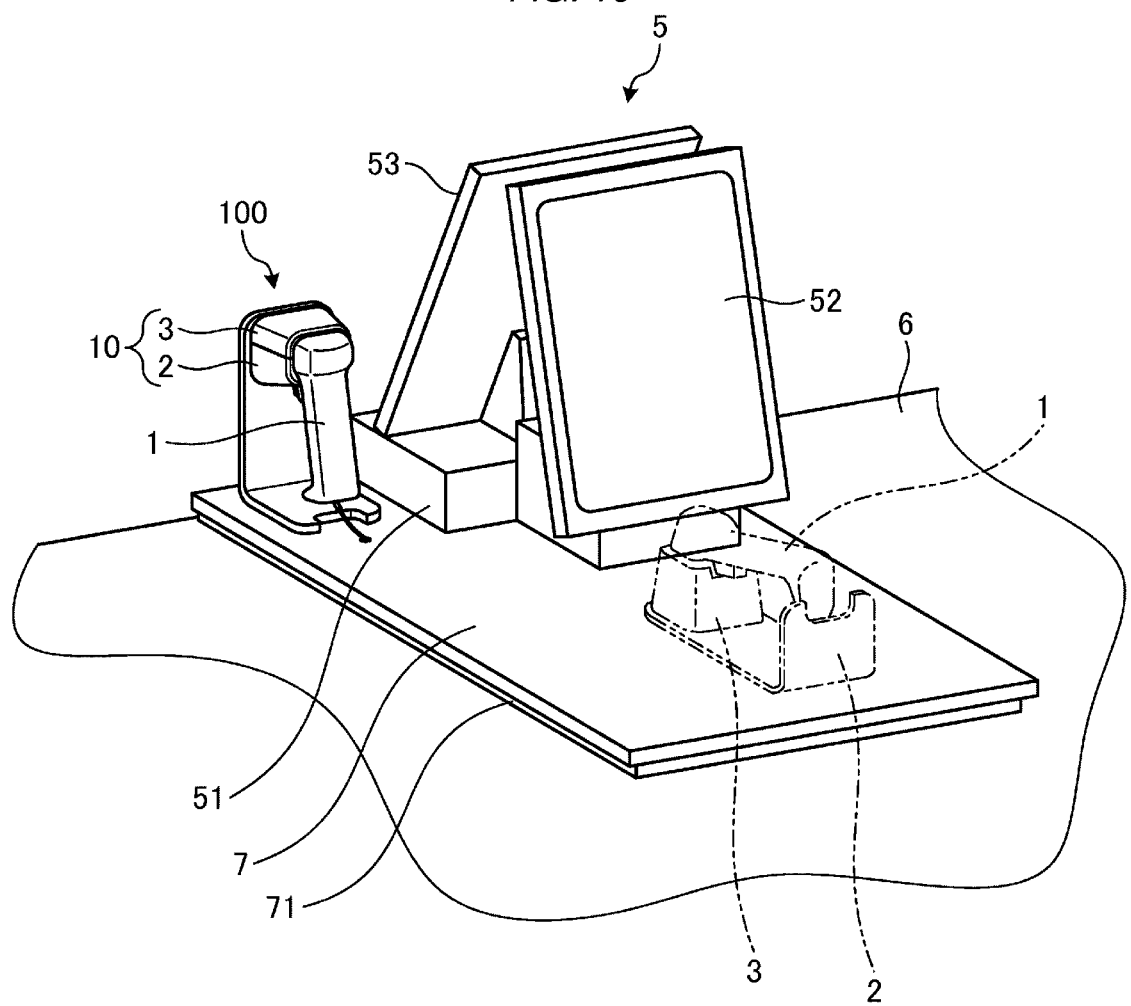
FIG. 10 is a perspective view showing an example of a use state of the reading device 100.

FIG. 10 is a perspective view showing an example of a use state of the reading device 100. The reading device 100 is used together with a POS terminal device 5, and outputs information (a code value and image data) to the POS terminal device 5. The POS terminal device 5 is an example of a sales information processing device. The POS terminal device 5 according to the embodiment is fixed on a table 7 and placed on a top surface of a checkout counter 9.

The POS terminal device 5 includes a main body portion 51, a store clerk display operation unit 52, a customer display operation unit 53, and the like. The main body portion 51 incorporates a control unit and the like that collectively controls units of the POS terminal device 5 and causes the units to function.

The store clerk display operation unit 52 is provided with a touch panel on a surface of a display device, displays information for the store clerk, and receives an operation according to a display content. If the POS terminal device is operating as a normal register, the store clerk display operation unit 52 receives an operation related to registration of a merchandise.

The customer display operation unit 53 is provided with a touch panel on a surface of a display device, displays information for the customer, and receives an operation according to a display content. If the POS terminal device is operating as a self-checkout device, the customer display operation unit 53 receives an operation related to registration of a merchandise. The POS terminal device 5 shown in FIG. 10 is operating as the self-checkout device.

Figure 11:
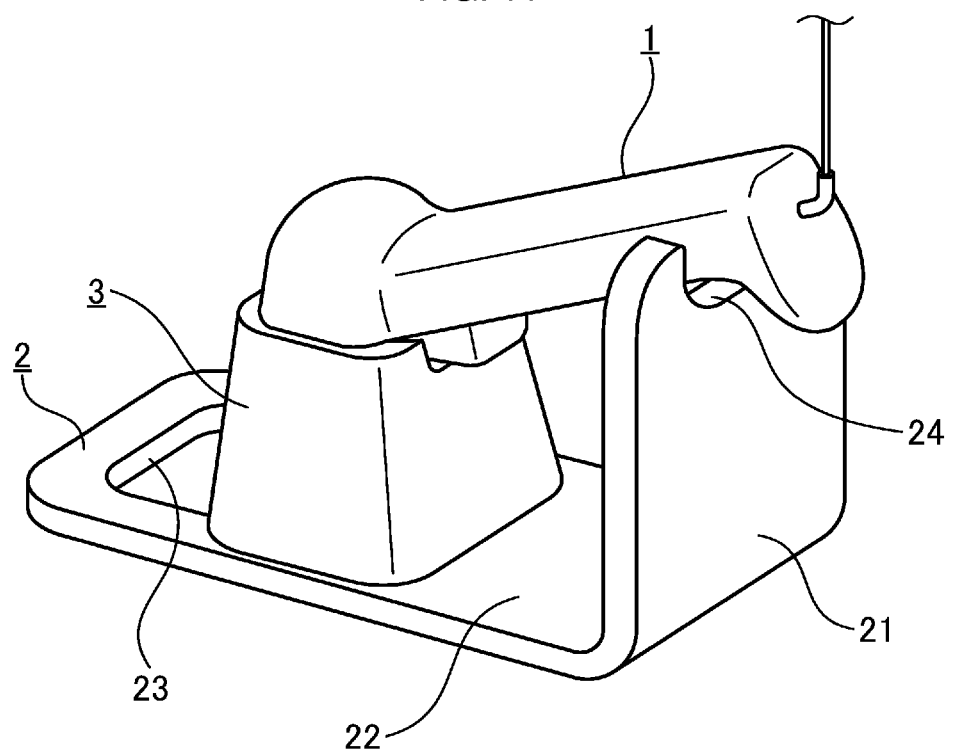
FIG. 11 is a perspective view showing the pedestal 2 holding the handy scanner 1 in a horizontally placed manner.

FIG. 11 is a perspective view showing the pedestal 2 holding the handy scanner 1 in a horizontally placed manner. If the POS terminal device 5 is operating as the normal register, the handy scanner 1 is used as the handy type. If the handy scanner 1 is used as the handy type, the pedestal 2 is horizontally placed so as to be easily utilized as a fixed position of the handy scanner 1 if not in use. That is, the flat plate portion 22 is placed to be in contact with an installation surface (the top surface of the table 7 or the like) and the flat plate portion 21 is substantially upright with respect to the installation surface, and the cutout portion 24 is positioned on an upward side of the flat plate portion 21.

If used in this state, the head 11 is placed above the flat plate portion 22, and the cutout portion 24 sandwiches and holds the handle 12 in a thickness direction to prevent the handle 12 from falling down. If the pedestal 2 is used as a place to hold the handy scanner 1 used as the handy type if not in use, for example, as indicated by virtual lines (two-dot chain lines) in FIG. 10, the pedestal 2 is placed in the vicinity of the store clerk display operation unit 52.

Figure 12:
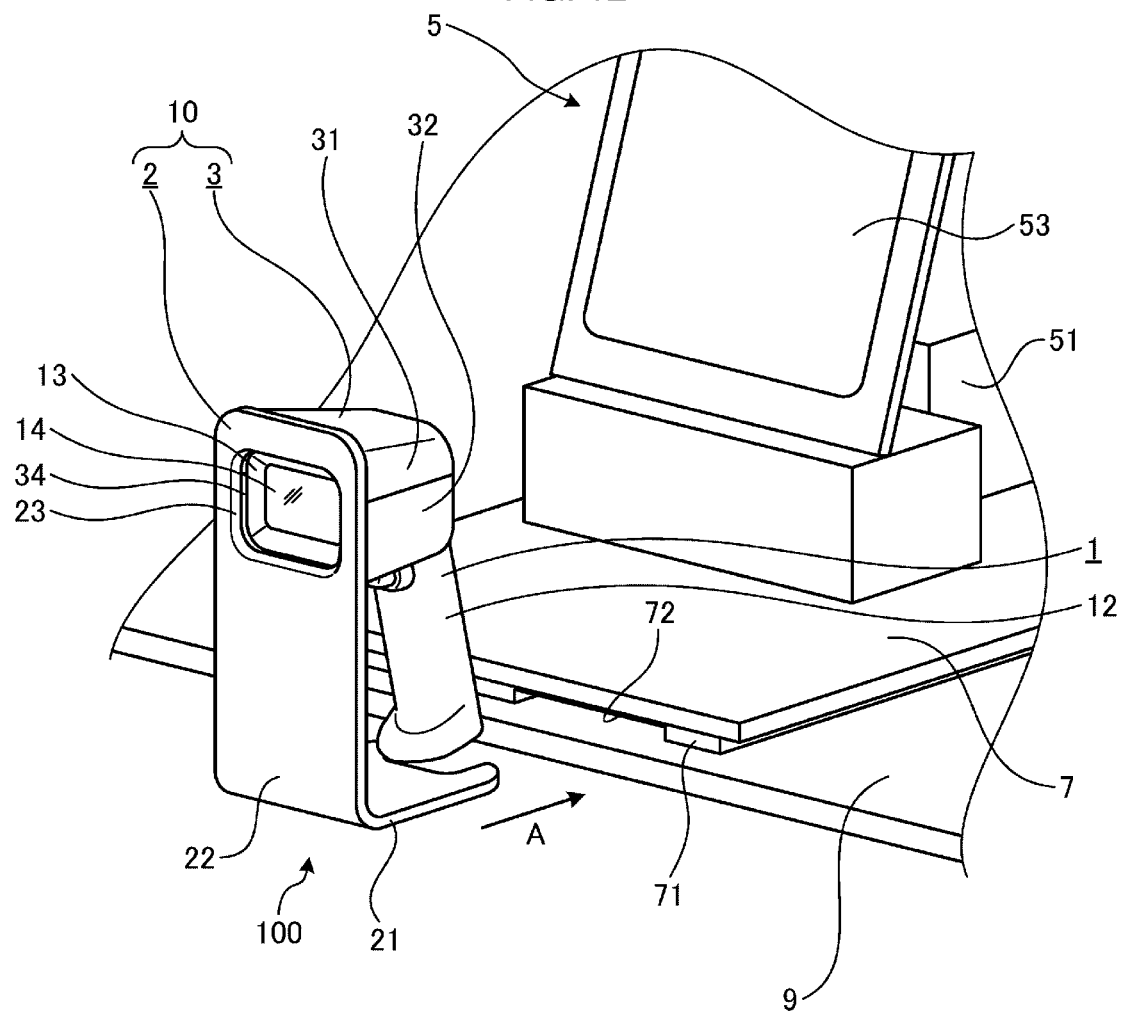
FIG. 12 is a perspective view showing an example of an installation manner for the reading device 100.
Figure 13:
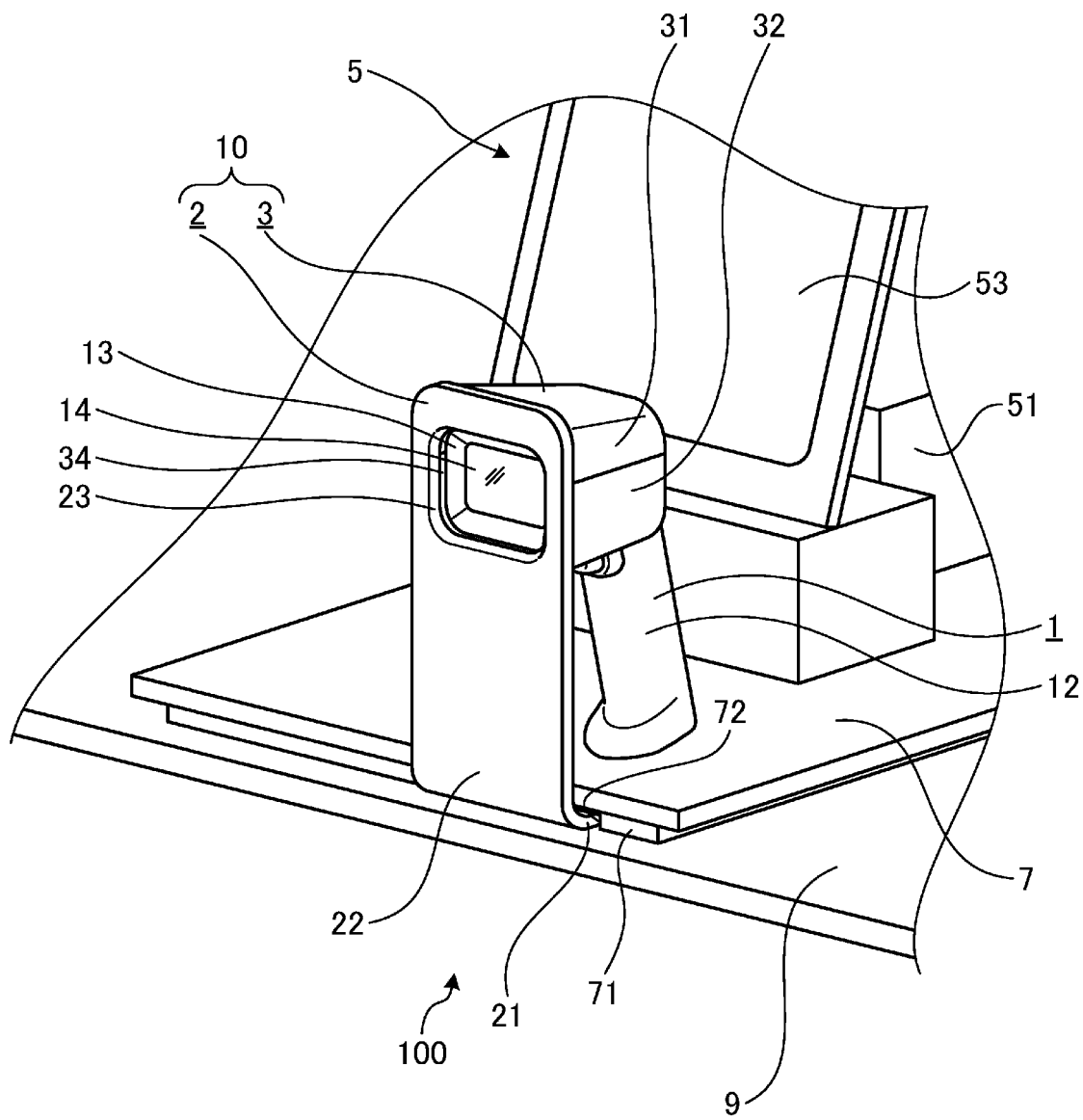
FIG. 13 is a perspective view showing an example of an installation state of the reading device 100.

FIG. 12 is a perspective view showing an example of an installation manner for the reading device 100. FIG. 13 is a perspective view showing an example of an installation state of the reading device 100.

The table 7 includes a foot 71 on a lower surface thereof. The foot 71 has a flat plate shape slightly smaller than the table 7. The foot 71 has a cutout portion 72 that opens on a side facing a customer who views the customer display operation unit 53. The cutout portion 72 is a recess having an inner surface having a shape corresponding to the flat plate portion 21 and having a size such that the inner surface is in contact with or slightly apart from the flat plate portion 21.

When the reading device 100 is moved in a direction indicated by an arrow A in FIG. 12, the flat plate portion 21 is inserted into the cutout portion 72, and the reading device 100 is fixed to the table 7 in the installation state shown in FIG. 13.

The reading device 100 used together with the POS terminal device 5 is used as the stationary type as shown in FIG. 13 if the POS terminal device 5 operates as the self-checkout device. In addition, if the POS terminal device 5 operates as the normal register for receiving various processes such as merchandise registration from the store clerk, the reading device 100 is installed in a horizontally placed manner at, for example, the position indicated by the virtual lines (the two-dot chain lines) in FIG. 10, so that the handy scanner 1 can be easily used as the handy type. When the pedestal 2 is used in the horizontally placed manner, the handle 12 may be placed to ride on the cutout portion 24 of the pedestal 2.

As described above, according to the first embodiment, the handy scanner 1 can be used as both the stationary type and the handy type. In the use mode of the stationary type reading device 100, operability close to that of a reading device built-in the self-checkout device can be provided.

The above embodiment can be modified and implemented as appropriate by changing a part of the configuration or function of each device described above. Therefore, hereinafter, modifications related to the above embodiment will be described as other embodiments. Hereinafter, differences from the embodiment will be mainly described, and detailed descriptions will be omitted with respect to similarities to the content already explained. Further, the modifications to be described below may be implemented individually or in combination as appropriate.

Second Embodiment

FIG. 14 is a diagram schematically showing an example of a coupling structure between the pedestal 2 and the adjuster 3. The pedestal 2 includes magnets 28 at portions of the flat plate portion 22 with which the adjuster 3 is in contact. The adjuster 3 includes iron plates 38 at portions facing the magnets 28. Accordingly, if the adjuster 3 is brought close to a predetermined position of the pedestal 2, the iron plates 38 are attracted to the magnets 28 as indicated by an arrow B in FIG. 14, and the adjuster 3 falls within the predetermined position of the pedestal 2.

According to the embodiment, the adjuster 3 can be easily positioned at the predetermined position of the pedestal 2. Therefore, the adjuster 3 and the handy scanner 1 can be easily attached to and detached from the pedestal 2.

Third Embodiment

Figure 15A:
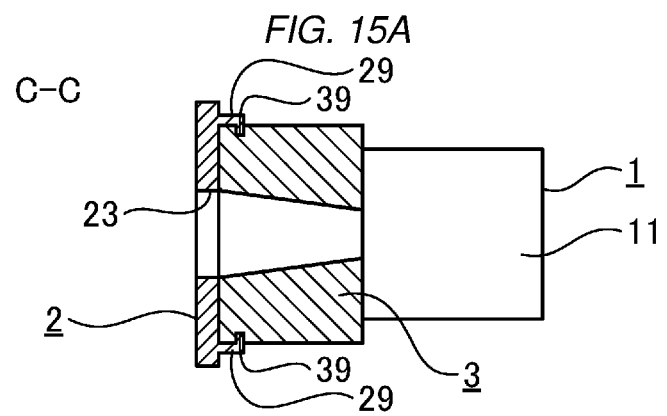
FIGS. 15A and 15B are diagrams schematically showing an example of a coupling structure between the pedestal 2 and the adjuster 3 according to a third embodiment, where
Figure 15B:
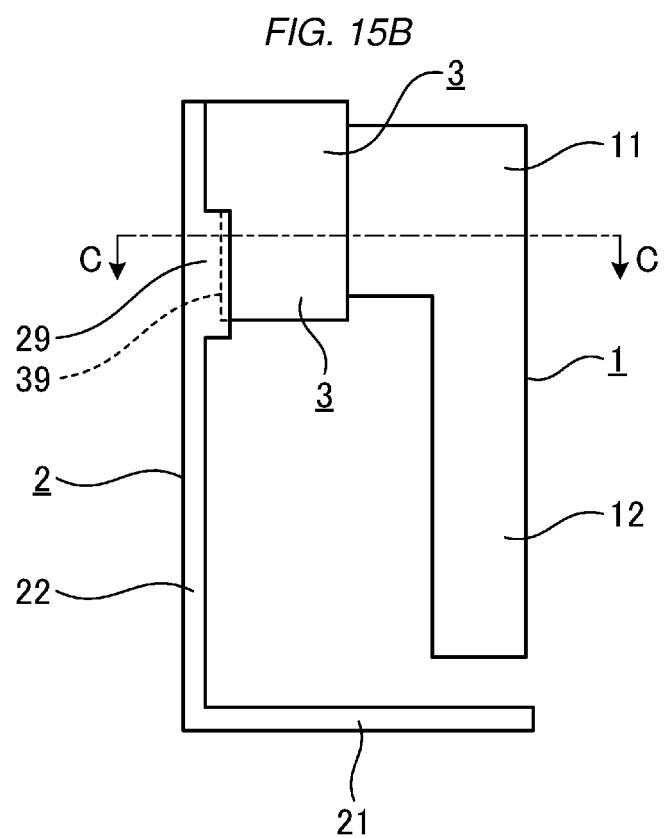

FIGS. 15A and 15B are diagrams schematically showing an example of a coupling structure between the pedestal 2 and the adjuster 3, where FIG. 15A is a plan view and FIG. 15B is a side view. FIG. 15A is a cross-sectional view taken along a line C-C in FIG. 15B.

Grooves 39 are formed on both side surfaces of the adjuster 3. The grooves 39 are cut from a lower end portion of the adjuster 3 to a center portion in the up-down direction. The pedestal 2 includes a pair of rails 29 that sandwich and guide portions where the grooves 39 of the adjuster 3 are located from both side surfaces. The rails 29 are provided to protrude from the flat plate portion 22, and distal end portions of the rails 29 are bent in a direction of being fitted into the grooves 39.

In such a configuration, by moving the adjuster 3 with respect to the pedestal 2 such that the grooves 39 are lowered from above the rails 29, the distal end portions of the rails 29 are fitted into the grooves 39. Since an area in which the grooves 39 are provided is not the entire area of the adjuster 3 in the up-down direction but the middle of the adjuster 3, the rails 29 do not pass through an upper end portion of the adjuster 3 and stops in the middle of the adjuster 3 in the up-down direction. Accordingly, the pedestal 2 supports the adjuster 3 at a predetermined position.

According to the embodiment, as compared to other embodiments, it is considered that the adjuster 3 is less likely to be separated from the pedestal 2 even if, for example, the reading device 100 falls down. Therefore, it is possible to prevent unintentional separation of the pedestal 2 and the adjuster 3 from occurring.

Fourth Embodiment

Figure 16:
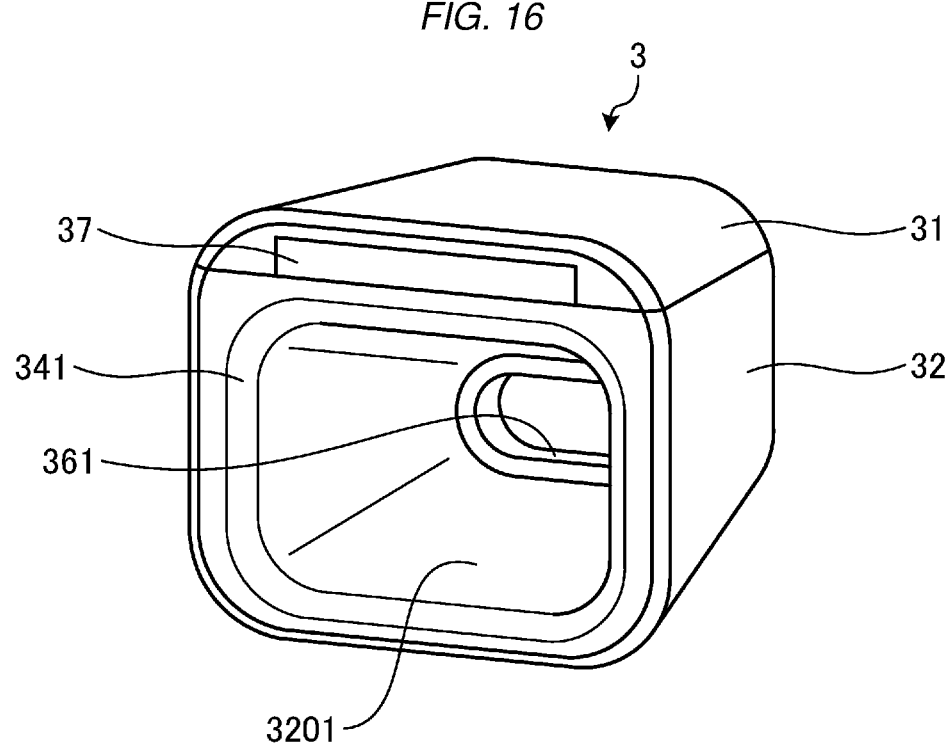
FIG. 16 is a perspective view showing an example of a shape of the adjuster 3 corresponding to a handy scanner having a special shape according to a fourth embodiment.
Figure 17:
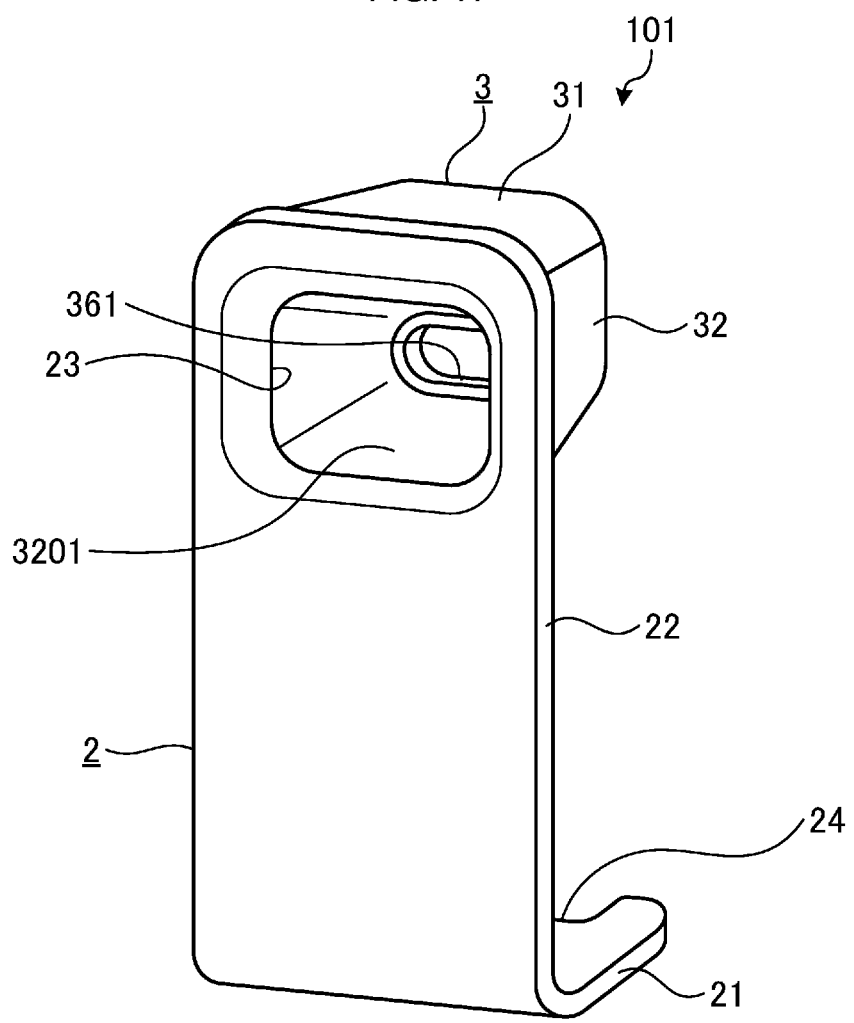
FIG. 17 is a perspective view viewed from the front side showing a state in which the adjuster 3 in FIG. 16 is fixed to the pedestal 2.
Figure 18:
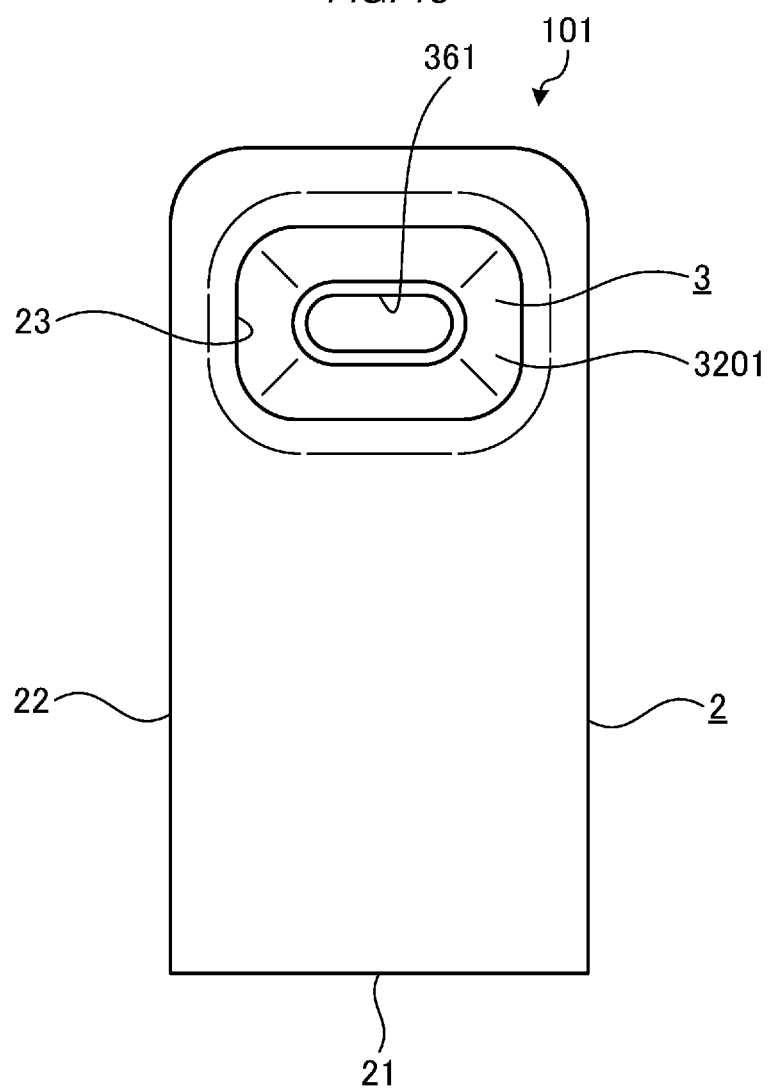
FIG. 18 is a front view showing the state.
Figure 19:
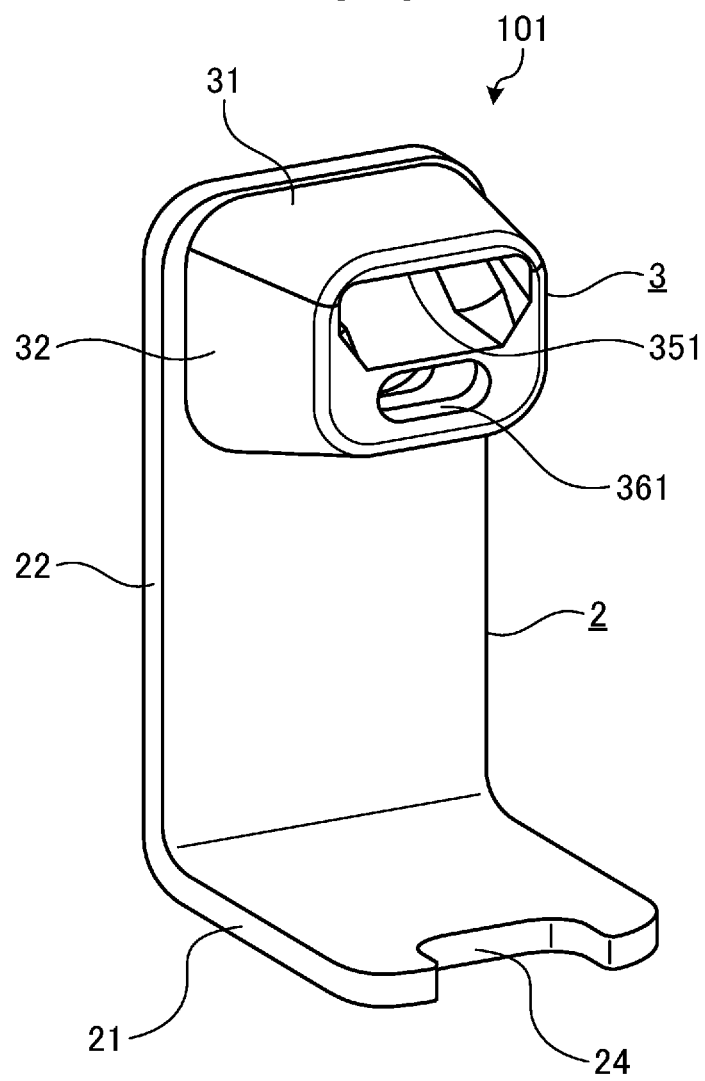
FIG. 19 is a perspective view viewed from the rear side showing the state.

FIG. 16 is a perspective view showing an example of a shape of the adjuster 3 corresponding to a handy scanner having a special shape (not shown). FIGS. 17, 18, and 19 are a perspective view from the front side, a front view, and a perspective view from the rear side, respectively, showing a state in which the adjuster 3 in FIG. 16 is fixed to the pedestal 2. The pedestal 2 and the adjuster 3 according to the embodiment constitute a holder 101 that holds a handy scanner having a special shape.

Certain handy scanners in recent years have a special shape in which a lower half of the head 11 (a handle 12 side) shown in FIG. 3 is not provided and the imaging sensor is exposed. The imaging sensor of such a handy scanner is disposed near an upper portion of the base of the handle 12.

The adjuster 3 has a shape spreading from the top to the bottom like a quadrangular pyramid, and has a hole 361 for exposing the imaging sensor at a position corresponding to the top of the pyramid. A position corresponding to the bottom of the pyramid is an opening 341, and no reading window is provided. In this way, the adjuster 3 has a tubular shape in which an imaging sensor side is narrow and a side facing a reading target is wide.

An inner peripheral surface 3201 of the adjuster 3 extends along a readable angular area and has a shape indicating a reading area. Accordingly, a user can easily estimate the reading area of the handy scanner.

A recess 351 into which the head 11 of the handy scanner is inserted is provided on the rear side of the adjuster 3 (see FIG. 19). The upper cover 31 and the lower cover 32 according to the embodiment are configured to bisect the recess 351 in the up-down direction.

In this way, according to the embodiment, even if the shape of the handy scanner is different from that in the related art, by making the shape of the adjuster 3 correspond to the handy scanner, it is possible to implement the reading device 100 that exhibits an effect same as that of the first embodiment.

In the above-described embodiments, the imaging sensor that performs area reading is described as an example of the reading sensor. In practice, the reading sensor may perform line reading. In this case, since a reading depth (a readable distance from the reading sensor) is shallower than that of the imaging sensor, or the like, it may be hard to place a reading target with respect to a reading device in a readable manner. However, such a problem may be solved by making effort to provide a reflecting mirror around the sensor, or the like.

While certain embodiments are described, these embodiments are presented as examples and are not intended to limit the scope of the exemplary embodiment. These novel embodiments may be implemented in a variety of other forms; various omissions, substitutions, and changes may be made without departing from the spirit of the exemplary embodiment. The accompanying claims and their equivalents are intended to cover such forms or modifications as would fall within the scope and spirit of the exemplary embodiment.

What is claimed is:

1. A reading device comprising:
    a handheld scanner including a head incorporating a reading sensor and a handle which is a gripping part having one end portion connected to the head, and configured to read a code symbol image by the reading sensor;
    an adjuster attached to the head and surrounding a readable angular area of the reading sensor; and
    a pedestal to which the adjuster is detachably coupled, and configured to hold the adjuster in such a direction that the readable angular area of the reading sensor is substantially equal in an up-down direction with respect to a horizontal direction,
    wherein the adjuster has a tubular shape,
    wherein an edge portion of the adjuster farther from the reading sensor and the pedestal form a coupling structure for detachably coupling each other, and
    wherein the pedestal includes a first flat plate portion having an opening corresponding to a reading area of the handheld scanner and coupled to one of edges of the adjuster at a position surrounding the opening, and a second flat plate portion substantially orthogonal to the first flat plate portion.

2. The reading device according to claim 1, wherein
    the adjuster has the tubular shape in which a reading sensor side is narrow and a reading target side of the reading sensor is wide, and
    an inner peripheral surface of the adjuster extends along the readable angular area of the reading sensor.

3. The reading device according to claim 1, wherein the adjuster comprises a first recess on a front side of an upper cover and a second recess on a front side of a lower cover.

4. The reading device according to claim 1, wherein the head comprises an imaging sensor.

5. The reading device according to claim 1, wherein the handheld scanner is configured for use in a stationary manner or in a movable manner.

6. The reading device according to claim 1, wherein the first flat plate portion and the second flat plate portion are continuous with each other.

7. The reading device according to claim 1, wherein the first flat plate portion and the second flat plate portion comprise a substantially L-shaped appearance in a side view.

8. A handheld scanner holder for supporting a handheld scanner including a head incorporating a reading sensor and a handle comprising a gripping part having one end portion connected to the head, and configured to read a code symbol image by the reading sensor, the handheld scanner holder comprising:
an adjuster attached to the head and surrounding a readable angular area of the reading sensor; and
a pedestal to which the adjuster is detachably coupled, and configured to hold the adjuster in such a direction that the readable angular area of the reading sensor is substantially equal in an up-down direction with respect to a horizontal direction,
wherein the adjuster has a tubular shape,
wherein an edge portion of the adjuster farther from the reading sensor and the pedestal form a coupling structure for detachably coupling each other, and
wherein the pedestal includes a first flat plate portion having an opening corresponding to a reading area of the handheld scanner and coupled to one of edges of the adjuster at a position surrounding the opening, and a second flat plate portion substantially orthogonal to the first flat plate portion.

9. The handheld scanner holder according to claim 8, wherein
the adjuster has the tubular shape in which a reading sensor side is narrow and a reading target side of the reading sensor is wide, and
an inner peripheral surface of the adjuster extends along the readable angular area of the reading sensor.

10. The handheld scanner holder according to claim 8, wherein the adjuster comprises a first recess on a front side of an upper cover and a second recess on a front side of a lower cover.

11. The handheld scanner holder according to claim 8, wherein the head comprises an imaging sensor.

12. The handheld scanner holder according to claim 9, wherein the first flat plate portion and the second flat plate portion are continuous with each other.

13. The handheld scanner holder according to claim 8, wherein the first flat plate portion and the second flat plate portion comprise a substantially L-shaped appearance in a side view.

14. A point-of-sale (POS) terminal, comprising:
a merchandise registration component;
a display; and
a reading device comprising:
a handheld scanner including a head incorporating a reading sensor and a handle which is a gripping part having one end portion connected to the head, and configured to read a code symbol image by the reading sensor;
an adjuster attached to the head and surrounding a readable angular area of the reading sensor; and
a pedestal to which the adjuster is detachably coupled, and configured to hold the adjuster in such a direction that the readable angular area of the reading sensor is substantially equal in an up-down direction with respect to a horizontal direction,
wherein the adjuster has a tubular shape,
wherein an edge portion of the adjuster farther from the reading sensor and the pedestal form a coupling structure for detachably coupling each other, and
wherein the pedestal includes a first flat plate portion having an opening corresponding to a reading area of the handheld scanner and coupled to one of edges of the adjuster at a position surrounding the opening, and a second flat plate portion substantially orthogonal to the first flat plate portion.

15. The POS terminal according to claim 14, wherein
the adjuster has the tubular shape in which a reading sensor side is narrow and a reading target side of the reading sensor is wide, and
an inner peripheral surface of the adjuster extends along the readable angular area of the reading sensor.

16. The POS terminal according to claim 14, wherein the adjuster comprises a first recess on a front side of an upper cover and a second recess on a front side of a lower cover.

17. The POS terminal according to claim 14, wherein the head comprises an imaging sensor.

18. The POS terminal according to claim 14, wherein the handheld scanner is configured for use in a stationary manner or in a movable manner.

19. The POS terminal according to claim 14, wherein the first flat plate portion and the second flat plate portion are continuous with each other.

20. The POS terminal according to claim 14, wherein the first flat plate portion and the second flat plate portion comprise a substantially L-shaped appearance in a side view.

* * * * *